United States Patent Office 3,451,170
Patented June 24, 1969

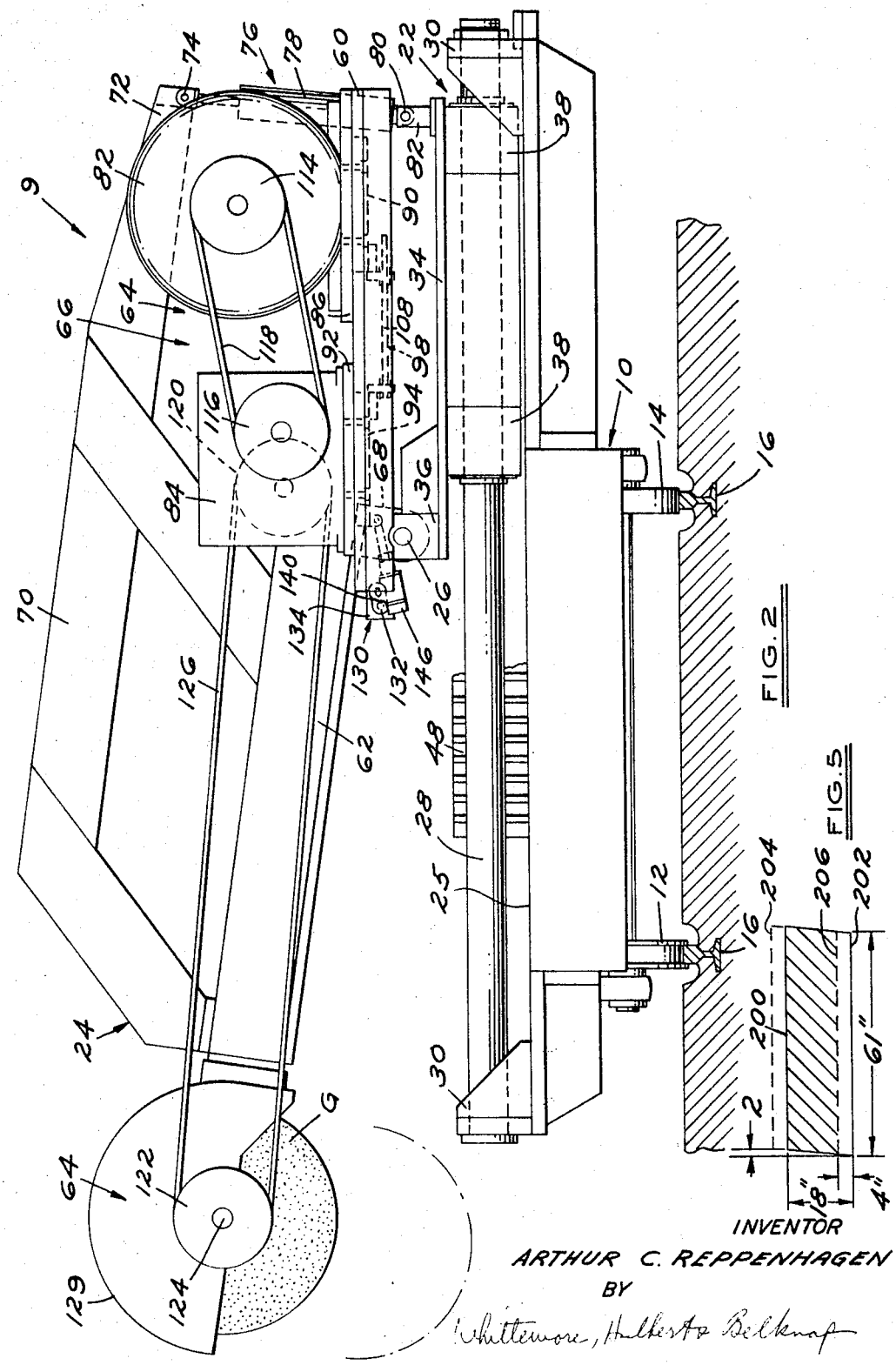

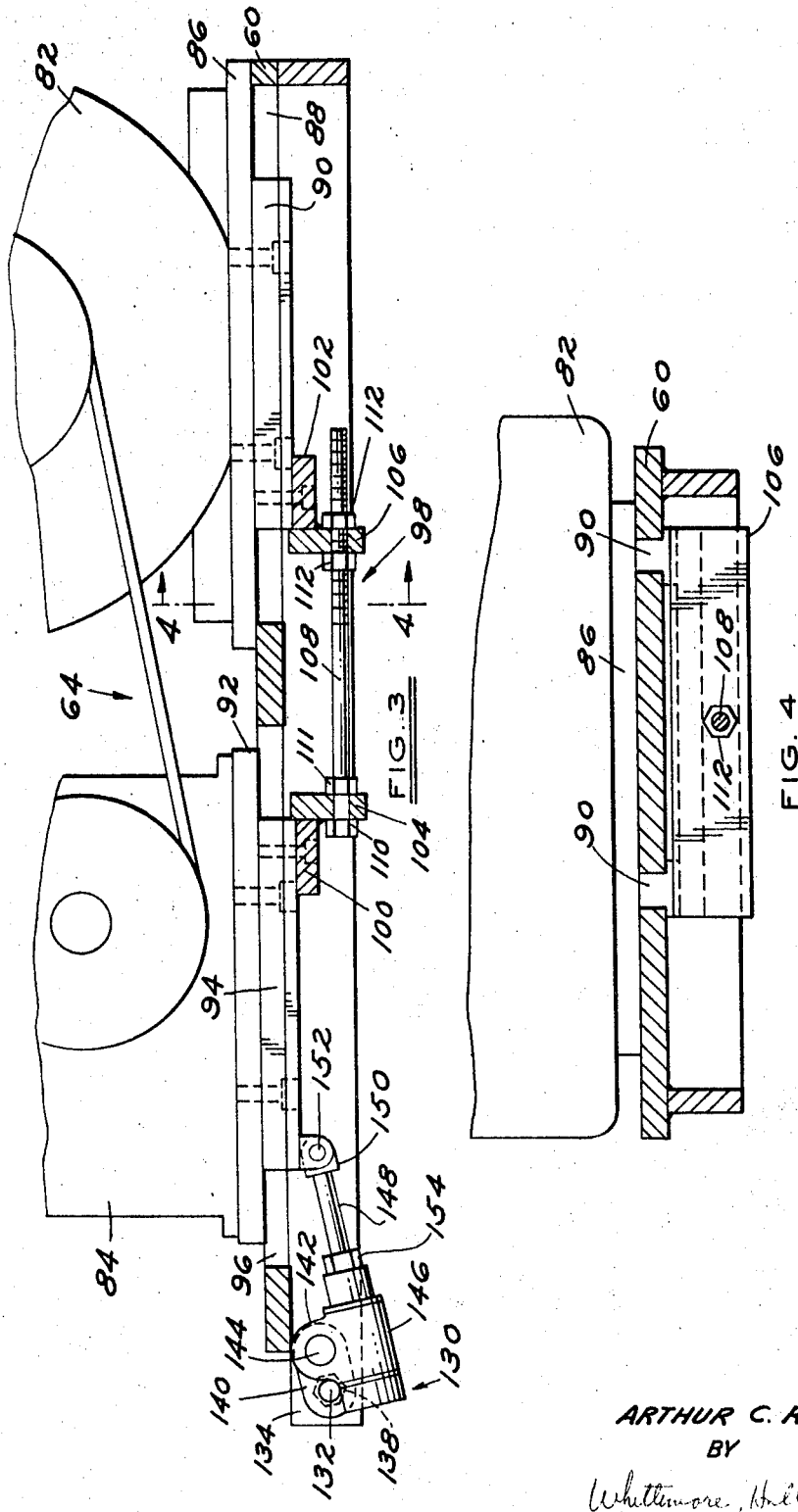

3,451,170
BILLET GRINDER
Arthur C. Reppenhagen, Owosso, Mich., assignor to
MWA Company, Owosso, Mich., a corporation of
Delaware
Filed June 20, 1966, Ser. No. 558,829
Int. Cl. B24b 7/00, 9/00, 21/00
U.S. Cl. 51—35                                    6 Claims

ABSTRACT OF THE DISCLOSURE

A machine for removing metal from a workpiece comprising a carriage, a saddle on the carriage movable transversely of the carriage path, a grinding unit including a base pivoted on the saddle for vertical swinging movement, a boom on the base extending outwardly therefrom in the direction of saddle movement, a grinding wheel on the outer end of the boom, power mechanism on the base having a flexible linear member for transmitting rotation to the grinding wheel, and means for moving the power mechanism in opposite directions to tension and untension the belt.

---

This invention relates generally to metal working machines and refers more particularly to a grinding machine for removing metal from workpieces such as billets and slabs.

It is an essential object of this invention to provide an improved grinding machine of the type having a carriage movable along a predetermined path, a saddle supported on the carriage for movement transversely of the carriage path, and a grinding unit, including a grinding wheel, pivoted on the saddle for oscillation in a vertical plane. Accordingly, the grinding wheel can be moved in transverse directions over the surface of a workpiece by reason of the carriage and saddle movements, and can be raised and lowered into and out of grinding contact with the surface of the workpiece.

Another object is to so locate the grinding wheel with respect to the pivot for the grinding unit that the grinding wheel will have a maximum grinding range.

Another object is to provide a grinding machine in which the grinding unit includes a boom having a grinding wheel on the outer end, and power mechanism for transmitting rotary power to the grinding wheel by means of a belt.

Another object is to provide a means for relieving the belt tension to permit the removal of the belt and, if desired, the replacement of a worn out grinding wheel.

Another object is to provide a grinding unit including a base pivoted on the saddle, a boom extending from the base and having a rotatable grinding wheel mounted on the outer end thereof, power mechanism having a driving belt extending to the grinding wheel, and means mounting the power mechanism on the base for movement in opposite directions toward and away from the grinding wheel to positions tensioning and untensioning the belt.

Another object is to provide a means for moving the power mechanism including a rotatable member having a crank connection to the power mechanism such that rotation of the member will effect the desired movement of the power mechanism.

Another object is to provide a crank connection which moves to an overcenter position when the belt is tensioned to prevent accidental untensioning of the belt, and stop means for engaging the crank connection in its overcenter position.

Other objects and features of the invention will become apparent as the description proceeds, especially when taken in conjunction with the accompanying drawings, wherein:

FIGURE 2 is a side elevation of the grinding machine shown in FIGURE 1.

FIGURE 3 is an enlarged fragmentary view of the structure shown in FIGURE 2, with parts in section.

FIGURE 4 is a fragmentary sectional view taken on the line 4—4 in FIGURE 3.

FIGURE 5 is a diagram illustrating the grindable area of the machine.

Figure 1:
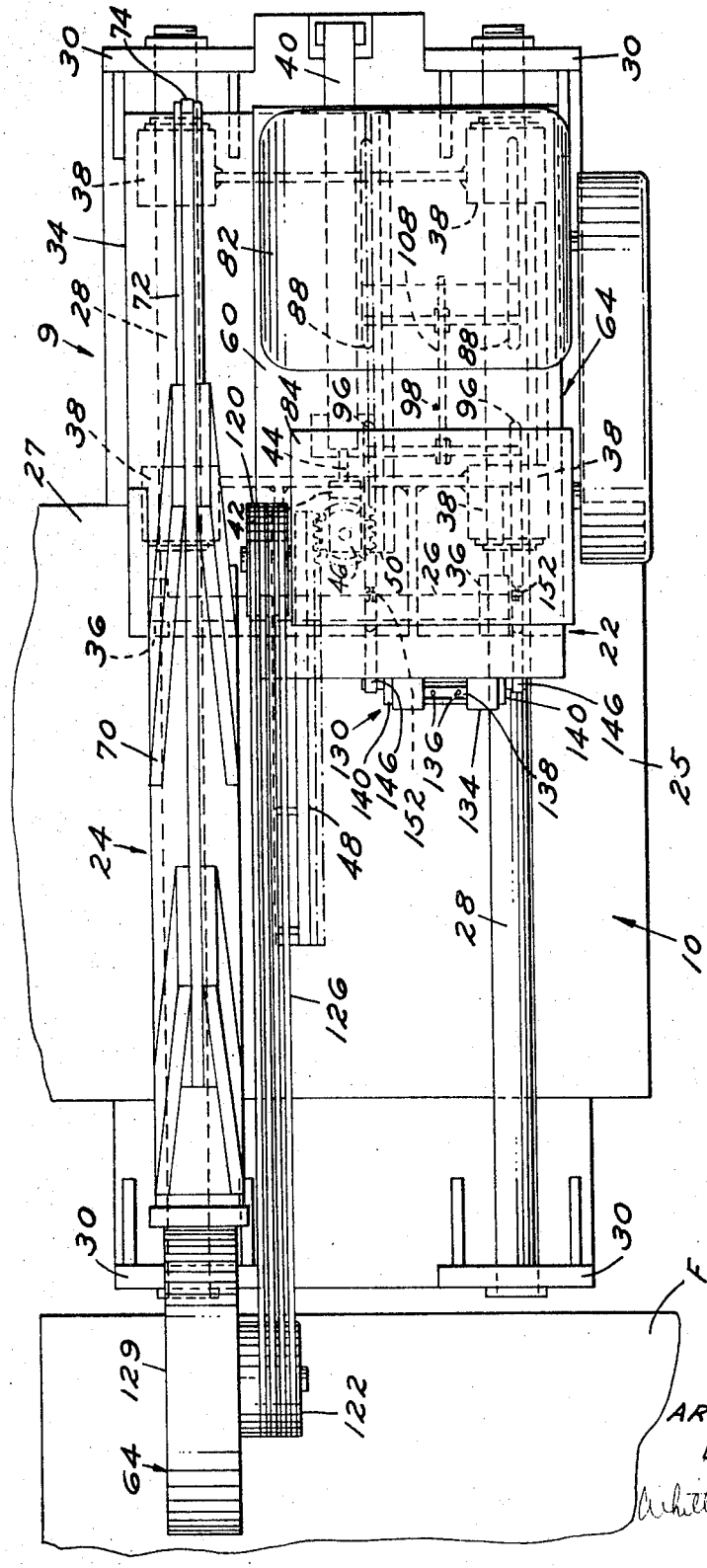
FIGURE 1 is a top plan view of a grinding machine constructed in accordance with my invention.

Referring now more particularly to the drawings, the grinding machine is generally indicated at 9 and comprises a carriage 10 having wheels 12 and 14 supporting the carriage for movement along a predetermined path on the tracks 16 embedded in the floor. The tracks 16 may for example extend parallel to the lengthwise dimension of a workpiece F supported in fixed position on a stationary support at one side of the tracks. The workpiece F is in the form of a slab, although it will be understood that the machine will grind workpieces of other shapes, such as billets of square cross-section, for example. The workpiece support is not shown, but supports the workpiece under the grinding wheel G, and the grinding wheel will grind a path on the workpiece along its length as the carriage moves on the tracks.

The machine also includes a saddle 22 mounted on the carriage for movement at right angles to the path of the carriage, and a grinding unit 24 mounted on the saddle for vertical swinging movement about the axis of horizontal pivot 26.

The carriage 10 includes a platform 25 which may have space for an operator's station (not shown) on the extension partially shown at 27 in FIGURE 1. The carriage 10 has a pair of cylindrical rods 28 mounted in laterally spaced relation on the platform 25 and extending at right angles to the path of the carriage. The opposite ends of the rods 28 are fixedly secured upon rod supports 30 rigidly secured to and projecting upwardly from the top surface of the carriage platform. The rods 28 provide tracks for the saddle 22 and guide it for movement on the carriage at right angles to the path of carriage movement.

The saddle has a deck 34 provided with the upstanding laterally spaced bearing support bosses 36. The horizontal pivot shaft 26 extends across the deck 34 parallel to the carriage tracks 16 and is journaled in the bearing support bosses 36.

Depending from the deck 34 of the saddle are the four journals 38. These journals are arranged in pairs, two of them being aligned and receiving one of the rods 28, and the other two being aligned and receiving the other rod 28. Accordingly, the journals 38 mount the saddle upon the rods 28 of the carriage in a manner permitting the saddle to slide from one end of the rods to the other in a direction at right angles to the path of the carriage.

A cylinder 40 is mounted on platform 25 of the carriage, extending parallel to rods 28. The cylinder 40 is located between rods 28 and has a piston (not shown) therein to which the follower 42 is connected by piston rod 44. The follower 42 has a freely turning pinion 46 mounted thereon on a vertical axis, one side of the pinion meshing with the rack 48 on the platform 25 of the carriage, and the other side of the pinion meshing with a rack 50 secured to the underside of the deck 34 of the saddle. The racks 48 and 50 extend parallel to the rods 28, that is in the direction of saddle movement. When the piston in cylinder 40 is extended to advance the saddle to the left in FIGURE 1, the movement of the saddle will be twice the stroke of the cylinder 40 by reason of the rack and pinion arrangement. Suitable controls are provided to reverse the cylinder so as to cause the saddle to return to its retracted position at the right on the carriage as viewed in FIGURE 1.

The grinding unit 24 includes a base 60, a boom 62 projecting outwardly from the base in the direction of saddle movement, a grinding head 64 mounted on the outer end of the boom, and a power transmission 66 mounted on the base 60. The base 60 of the saddle has depending bearings 68 journaled upon the horizontal shaft 26 to provide the means for mounting the grinding unit upon the saddle for vertical swinging movement about the horizontal axis of shaft 26.

The boom 62 has a rigidifying frame structure 70. This frame structure 70 has a rearwardly extending portion 72 secured to the connecting rod 74 of the hydraulic piston cylinder assembly 76. The hydraulic assembly 76 includes a cylinder 78 pivoted at 80 to a bracket 82 on the deck 34 of the saddle, a piston (not shown) within the cylinder, and the connecting rod 74 which as stated is secured to the rear end 72 of the frame structure 70 of the boom 62. Suitable controls may be provided to reverse the piston within cylinder 78 to raise and lower the grinding head 64 on the outer end of the boom. Actually, the entire grinding unit will pivot about shaft 26 in response to the operation of the hydraulic assembly 76, it being understood that the boom 62 is rigid with the base 60 of the grinding unit. The inner end of the boom 62 and the rigidifying structure 70 are rigidly secured to the forward end of base 60.

The power transmission includes a motor unit 82 and a gear reduction unit 84. The motor unit 82 is mounted on a flat support 86 which is slidable on the flat top surface of the base 60. The base 60 has slots 88 which are parallel to one another beneath the motor support 86. The slots are parallel to rods 28. The motor support 86 has the depending slide members 90 of inverted V-shaped configuration which fit into the slots 88 and engage the under side of the base 60 to support the motor unit for sliding movement on the base in the direction of saddle movement, but preventing the motor unit from lifting up from the base.

The gear reduction unit 84 has a flat support 92 on its under surface which likewise slides on the smooth top surface of the base 60. The inverted T-shaped slide members 94 on the under surface of the support 92 slidably fit into parallel slots 96 in the base 60, which slots are parallel to rods 28, to permit the gear reduction unit 84 to slide in the direction of saddle movement but preventing the gear reduction unit from lifting up from the base 60.

The distance between the motor unit 82 and the gear reduction unit 84 is adjustable and is determined by the adjustable connection 98. As viewed in FIGURE 2, a bar 100 extends across and is secured to the rear ends of the slide members 94, and a similar bar 102 extends across and is secured to the front ends of the slide members 90. Secured by any suitable means to the bar members 100 and 102 are the plates 104 and 106. An elongated bolt 108 extends between the plate members 104 and 106. Bolt 108 is rigidly clamped to the plate 104 by the bolt head 110 and nut 111. Nuts 112 threaded on bolt 108 secure the plate 106 in adjusted position on the end of the bolt. By a simple threaded manipulation of nuts 112, the distance between the motor unit 82 and gear reduction unit 84 may be varied. Obviously, two or more bolts may be employed if desired.

The motor unit has an output pulley 114 and the gear reduction unit has an input pulley 116. A belt 118 extends around the pulleys to transmit power from the motor to the gear reduction unit. Belt tension depends upon the spacing between the motor unit and the gear reduction unit as determined by the adjustment of the connection 98.

The gear reduction unit has an output pulley 120, and the grinding head 64 has a pulley 122. The pulley 122 is secured by any suitable means to the shaft 124 to which the grinding wheel G is also secured. A belt 126 extends over pulleys 120 and 122 to transmit the drive from gear reduction unit 84 to the grinding wheel G. Grinding wheel G is shrouded in a cover 129.

Under normal operating conditions, the power transmission 66 is in the position shown in FIGURE 2 with relation to the grinding head 64 so that the belt 126 is under a proper tension to transmit rotation from the gear reduction unit 84 to the grinding wheel G. After a certain period of use, the grinding wheel is worn to a condition in which it requires replacement and for that purpose the belt 126 has to be removed to permit access to the grinding wheel. The details of construction of the grinding head and shroud which necessitate removal of the belt 126 before the grinding wheel can be removed, will not be described, but only enough description will be supplied to explain how the tension on the transmission belt 126 may be relieved sufficiently to remove the belt in order to make it possible to replace the grinding wheel.

Referring particularly to FIGURES 1, 2 and 3, the so-called belt tightener unit 130 is illustrated which normally maintains the tension on driving belt 126 but which may be operated to relieve the tension on the belt enough to permit the removal of the belt. The tightener unit includes a shaft 132 at the front end of the saddle which is journaled for rotation in the bosses 134 projecting from the front end of the saddle. In between bosses 134, the shaft 132 has a sleeve secured thereon by set screws 136. The sleeve is designated 138 and is of polygonal form so that a wrench may be applied to the sleeve to rotate the shaft 132.

The ends of the shaft 132 project beyond the two bosses 134 and have secured thereon for rotation as a unit therewith the two plates 140 which are actually crank members. The free or swinging ends of the crank members are pivoted to the yoke formations 142 by pivot pins 144. The yoke formations 142 are portions of the connecting rod heads 146. The connecting rod heads each have a rod portion 148 provided with a clevis 150 at the free end which is pivoted by a pin 152 to the front end of a slide member 94. The rods 148 are threaded on the ends which extend into the heads 146 so that by removing the clevis pin 152 the rods 148 may be rotated to adjust the overall length of the connection. Nuts 154 are provided to lock the rods 148 in axially adjusted position with respect to heads 146. One connecting rod 148 is pivoted at 152 to one of the slide members 94 and the other rod member 148 is pivoted at 152 to the other slide member.

The belt tightener device 130 is normally in the position shown in FIGURE 3 for operation of the grinding machine. In this position, the transmission 66 is in a rearward position of adjustment with respect to the grinding head to place sufficient tension on belt 126 to permit transmission of driving rotation to the grinding wheel G. In this position, it will be noted that the pivots 144 are above shaft 132. It will also be noted that the yokes 142 are in engagement with the under surface of the base 60 of the grinding unit. Hence, the tension in belt 126 tending to move the transmission 66 to the left in FIGURE 3 will be resisted by the engagement of the yokes 142 with the base. The cranks are over center in this position by reason of the fact that the pivots 144 are above shaft 132, so that the cranks cannot accidentally swing in a counter-clockwise direction and release the tension on the belt 126.

When it is desired to remove the belt 126 for any reason, as in the event that it is desired to replace a worn-out or damaged grinding wheel G, a wrench may be applied to the polygonal sleeve 138 on shaft 132 to rotate shaft 132 clockwise in FIGURE 3 and thereby move the transmission 66 to the right sufficiently to permit the belt 126 to be removed from pulleys 120 and 122. No more than 180 degrees of clockwise rotation of shaft 132 from the FIGURE 3 position is required for this purpose.

It will be noted in FIGURE 2 that the boom 62 extends outward from the saddle 22 in the direction of saddle movement and is substantially horizontal, although inclined upward a few degrees. This is the upper limit of vertical swinging of the boom. The boom may also swing downward to a lower limit in which the grinding wheel assumes a position substantially as shown in dotted lines. As noted, the underside of the grinding wheel, that is its lower periphery, is above axis 26 of vertical swinging of the boom in the upper limit of the boom and below the axis 26 in the lower position of the boom. The boom does not move very far from a substantially horizontal condition throughout its vertical swinging. Even more important, throughout the range of vertical movement the lower work-engaging periphery of the grinding wheel does not move far from a horizontal plane containing pivot axis 26, and therefore the work-engaging underside of the grinding wheel has a horizontal component of movement which is very small compared to the vertical component.

FIGURE 5 is a diagram which illustrates the grindable area for this machine assuming a 61" travel of the saddle as indicated by the width of the diagram. The vertical movement of the grinding wheel is 18" as indicated.

The line 200 designates the contact of the under surface of a 24" diameter grinding wheel with a billet or slab in the upper limit of the boom, and the line 202 indicates the engagement of the under surface of the 24" grinding wheel at the lower limit of the boom. The line 204 indicates the contact of the under surface of a worn 16" diameter grinding wheel with a slab or billet in the upper limit of the boom and the line 206 indicates the contact of the under surface of the 16" diameter grinding wheel with the slab or billet in the lower position of the boom.

The minimum area of work which can be ground with a grinding wheel of any diameter between 16" and 24" is hatched in the diagram. This is a large area and is due primarily to the fact that the grinding wheel is near the level of pivot 26 so that the point of contact with the work shifts only slightly throughout the range of vertical movement of the boom. As seen in FIGURE 5, the point of contact of the grinding wheel shifts less than 2" horizontally throughout the range of vertical boom movement.

What I claim as my invention is:

1. A machine for removing metal from a workpiece comprising a carriage movable along a predetermined path, a saddle supported on said carriage for movement transversely of the path of movement of said carriage, a grinding unit including a base mounted on said saddle for pivotal movement about a horizontal axis, a boom rigidly mounted on said base and extending outwardly therefrom in the direction of saddle movement, means for pivoting said base about said horizontal axis to similarly move said boom, a grinding head having a rotatable grinding wheel and mounted on said boom adjacent the outer end thereof, said grinding head including a pulley connected to said grinding wheel, power mechanism having a pulley and a belt extending over said pulleys to rotate said grinding wheel, means mounting said power mechanism on said base for movement in opposite directions away from and toward said grinding head to positions tensioning and untensioning said belt, said power mechanism being movable toward said grinding head far enough to permit removal of said belt from said pulleys, means for moving said power mechanism in said opposite directions, said moving means including a rotatable shaft, a crank rotatable with said shaft and a connecting rod from said crank to said power mechanism, rotation of said shaft operating through said crank and connecting rod to effect the aforesaid movement of said power mechanism, said crank assuming an over-center position with respect to said shaft when said power mechanism is in a position to tension said belt so as to prevent accidental reversal of said crank and resultant untensioning of said belt, stop means for said crank in said over-center position, said shaft having a polygonal portion and adapted to be rotated manually with a wrench, said power mechanism comprising a motor unit and a transmission unit driven by said motor unit, said connecting rod being connected to one of said units, said second-mentioned pulley being mounted on said transmission unit, said motor unit and said transmission unit being separately slidably mounted on said base for movement in the aforesaid opposite directions, and means providing a connection between said motor unit and said transmission unit for simultaneous movement thereof.

2. The machine defined in claim 1, wherein a drive belt extends from said motor unit to said transmission unit to operate the latter, and said connection means between said motor unit and said transmission unit is adjustable to vary the distance between said motor unit and said transmission unit.

3. A machine for removing metal from a workpiece comprising a carriage movable along a predetermined path, a saddle supported on said carriage for movement at right angles to the path of said carriage, a grinding unit including a base mounted on said saddle for pivotal movement about a horizontal axis extending in the direction of carriage movement, a boom mounted on said base and extending outwardly therefrom in the direction of saddle movement, means for pivoting said base about said horizontal axis to similarly move said boom, a grinding head having a rotatable grinding wheel and mounted on said boom adjacent the outer end thereof, power mechanism for rotating said grinding wheel, said power mechanism having a rotatable member, said grinding head having a rotatable member connected to said grinding wheel, an endless flexible linear member extending over said rotatable members to transmit rotation from said power mechanism to said grinding wheel, means mounting said power mechanism on said base for movement in opposite directions away from and toward said grinding head between a position tensioning said linear member and a position untensioning said linear member and permitting removal of the same from said rotatable members, means for moving said power mechanism in said opposite directions, said moving means including a rotatable shaft, a crank rotatable with said shaft and a connecting rod from said crank to said power mechanism, rotation of said shaft operating through said crank and connecting rod to effect the aforesaid movement of said power mechanism, said boom extending generally horizontally and being capable of swinging vertically about said horizontal axis between positions in which the lower work-engaging periphery of said grinding wheel is respectively above and below the level of said horizontal axis.

4. A machine for removing metal from a workpiece comprising a carriage movable along a predetermined path, a saddle supported on said carriage for movement at right angles to the path of said carriage, a grinding unit including a base mounted on said saddle for pivotal movement about a horizontal axis extending in the direction of carriage movement, a boom mounted on said base and extending outwardly therefrom in the direction of saddle movement, means for pivoting said base about said horizontal axis to similarly move said boom, a grinding head having a rotatable grinding wheel and mounted on said boom adjacent the outer end thereof, power mechanism for rotating said grinding wheel, said power mechanism having a rotatable member, said grinding head having a rotatable member connected to said grinding wheel, an endless flexible linear member extending over said rotatable members to transmit rotation from said power mechanism to said grinding wheel, means mounting said power mechanism on said base for movement in opposite directions away from and toward said grinding head between a position tensioning said linear member and a position untensioning said linear member and permitting removal of the same from said rotatable members, means for moving said power mechanism in said opposite directions, said boom extending generally horizontally and being capable of swinging vertically about said horizontal axis between positions in which the lower work-engaging periphery of said grinding wheel is respectively above and below the level of said horizontal axis, said power mechanism comprising a motor unit and a transmission unit driven by said motor unit, said first-mentioned rotatable member being mounted on said transmission unit, said motor unit and said transmission unit being separately slidably mounted on said base for movement in the aforesaid opposite directions, and means providing an adjustable connection between said motor unit and said transmission unit for simultaneous movement thereof.

5. The machine defined in claim 4, wherein said moving means includes a rotatable shaft, a crank rotatable with said shaft and a connecting rod from said crank to one of said units, rotation of said shaft operating through said crank and connecting rod to effect the aforesaid movement of said power mechanism.

6. The machine defined in claim 5, wherein said crank assumes an over-center position with respect to said shaft when said power mechanism is in a position to tension said belt so as to prevent accidental reversal of said crank and resultant untensioning of said belt, and stop means for said crank in said over-center position.

References Cited

UNITED STATES PATENTS

| 3,245,176 | 4/1966 | Muehling | 51—35 X |
| 3,207,332 | 9/1965 | Buschbom | 74—242.13 X |
| 3,089,287 | 5/1963 | Dilks | 51—35 |
| 1,353,986 | 9/1920 | Bergendorf. | |
| 2,413,265 | 12/1946 | Thompson | 74—242.14 |

FOREIGN PATENTS 624,821   6/1949   Great Britain.

JAMES L. JONES, JR., *Primary Examiner.*

U.S. Cl. X.R.

51—135, 148